United States Patent [19]

Indorf

[11] Patent Number: 4,905,948

[45] Date of Patent: Mar. 6, 1990

[54] CONTINUOUS LOOP CHAIN SUPPORT APPARATUS

[76] Inventor: Samuel E. Indorf, S. 7103 Oak Rd., Spokane, Wash. 99204

[21] Appl. No.: 247,045

[22] Filed: Sep. 20, 1988

[51] Int. Cl.$^4$ .................................................. A47F 7/00
[52] U.S. Cl. ................................ 248/309.1; 242/85.1
[58] Field of Search .................. 248/309.1, 298, 295.1, 248/316.4; 242/85.1; 211/13

[56] References Cited

U.S. PATENT DOCUMENTS

| | | | |
|---|---|---|---|
| 1,728,106 | 9/1929 | Collins | 242/85.1 |
| 2,138,299 | 11/1938 | Gruebel | 242/85.1 |
| 2,690,152 | 9/1954 | Riccio | 248/85.1 |
| 2,712,908 | 7/1955 | Kozminski | 242/85.1 |
| 3,591,119 | 7/1971 | Norroal | 248/309.1 |
| 4,033,276 | 7/1977 | Barr | 248/316.4 |
| 4,706,359 | 11/1987 | Greenhill | 248/DIG. 6 |

Primary Examiner—Alvin C. Chin-Shue
Attorney, Agent, or Firm—Wells, St. John & Roberts

[57] ABSTRACT

A transport and storage apparatus for a continuous loop roller chain is disclosed. The apparatus is specifically adapted for continuous loop roller chains comprised of individual links having at least one plate and an interconnecting pin which interconnects a pair of immediately adjacent links. Such pins restrict such adjacent links to pivoting relative to one another about a single pivot axis. The support apparatus comprises first and second chain blocks having a thickness dimension at least as great as the thickness of the individual links. The first and second chain blocks are movably coupled to and biased from one another for placing a continuous loop chain internally received thereby in tension to maintain such a chain in an expanded and untangled condition.

14 Claims, 3 Drawing Sheets

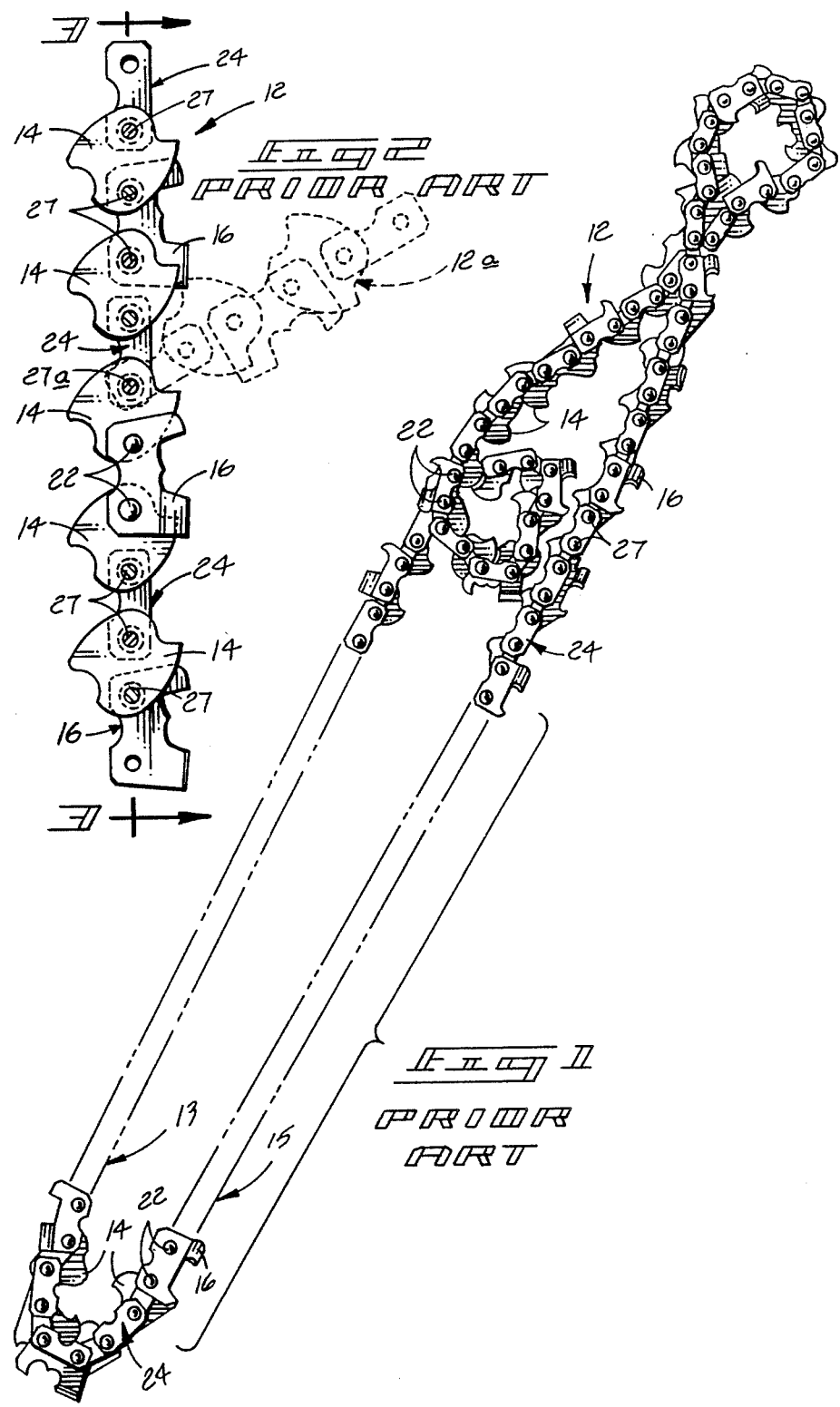

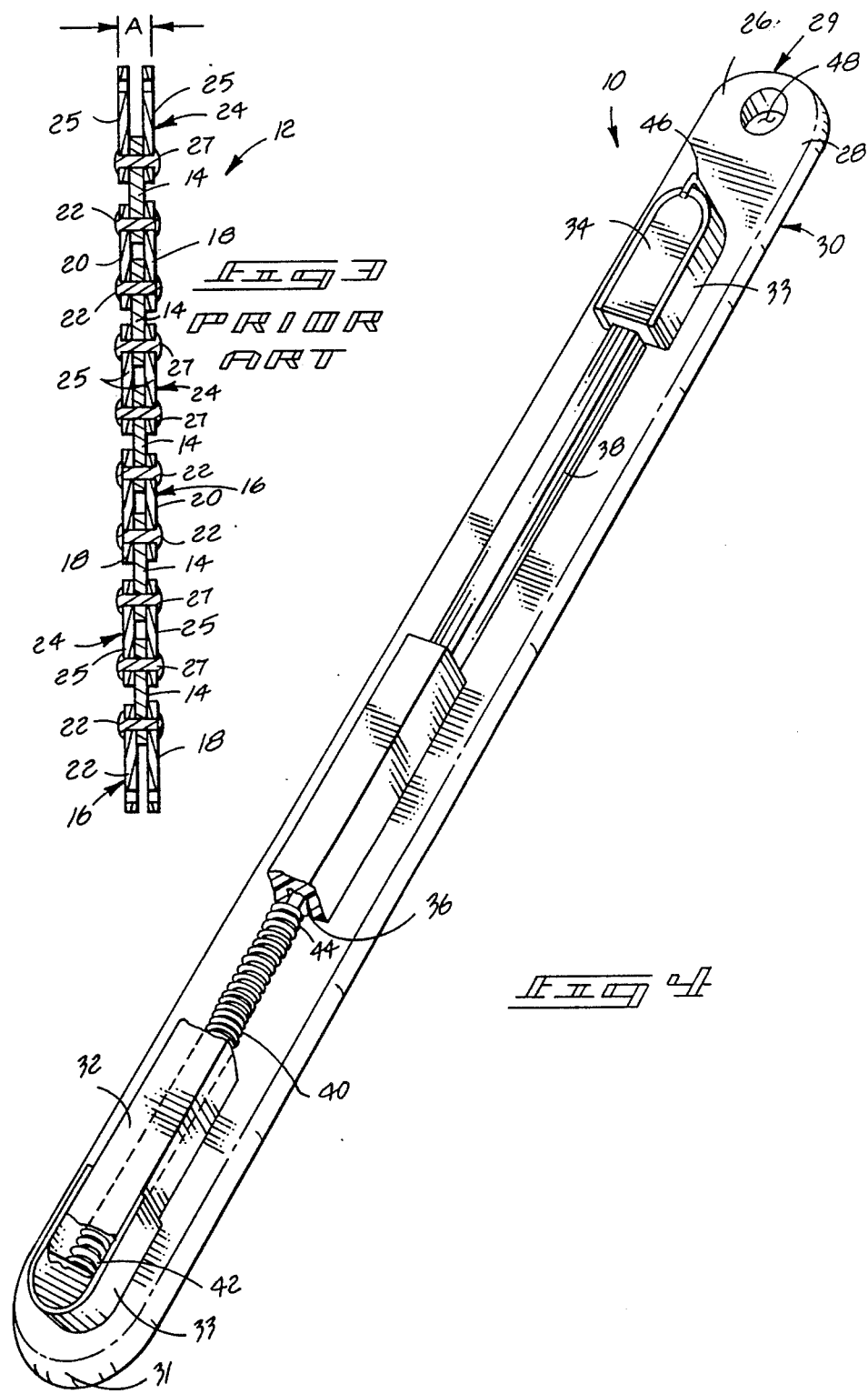

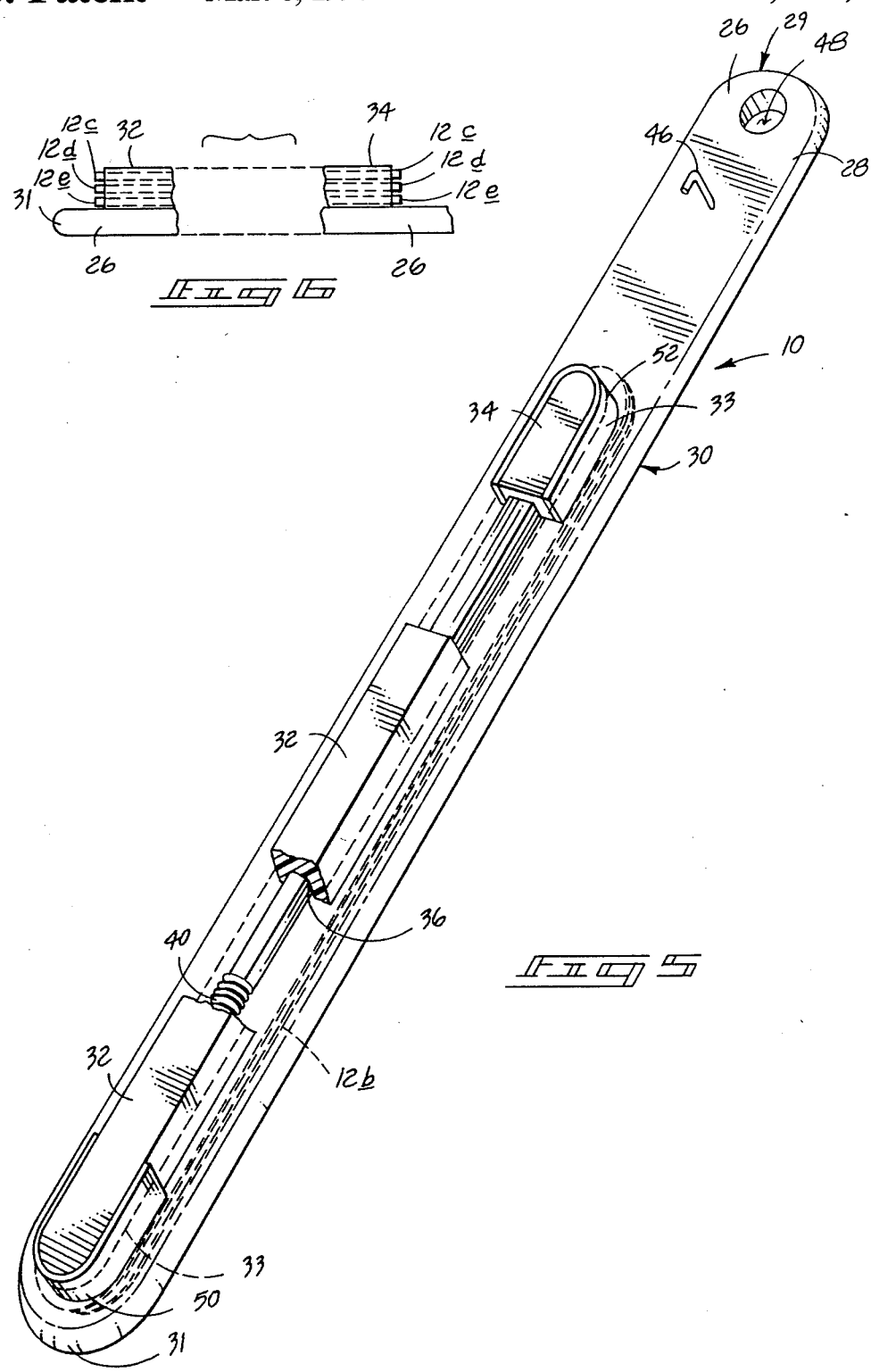

CONTINUOUS LOOP CHAIN SUPPORT APPARATUS

TECHNICAL FIELD

This invention relates to storage devices for continuous loop roller chains having interconnected individual links with at least one plate and an interconnecting pin, in which the pin interconnects a pair of immediately adjacent links and restricts such adjacent links to pivoting relative to one another about a single pivot axis.

BACKGROUND OF THE INVENTION

Examples of roller chains falling within the technical field of this invention include bicycle chains and saw chains used in chain saws. It is very common for one such chain to become tangled with itself when it is removed from the sprockets on which it is supported during use. Untangling of such chains is tedious at best, and can be dangerous with saw chain due to the sharp nature of the cutting elements which the chain carries.

This invention is directed to overcoming the problems associated with the tangling of such chains when removed from their operating environment.

BRIEF DESCRIPTION OF THE DRAWINGS

Preferred embodiments of the invention are illustrated in the accompanying drawings, in which:

FIG. 1 is a broken perspective view of a tangled continuous loop roller saw chain.

FIG. 2 is an enlarged partial side view of a portion of the saw chain of FIG. 1.

FIG. 3 is a cross sectional view taken along line 3—3 in FIG. 2.

FIG. 4 is a broken, fragmentary perspective view of a preferred embodiment of a transport and storage support apparatus for a continuous loop chain in accordance with the invention.

FIG. 5 is a perspective view of the support apparatus of FIG. 4 illustrated in an operational state maintaining a continuous loop chain, which is diagrammatically illustrated in dotted line, in an expanded and untangled condition.

FIG. 6 is a broken and fragmentary side elevational view of the support apparatus shown receiving multiple chains in accordance with the invention.

DETAILED DESCRIPTION OF PREFERRED EMBODIMENTS

The following disclosure of the invention is submitted in compliance with the constitutional purpose of the Patent Laws "to promote the progress of science and useful arts" (Article 1, Section 8).

Referring to FIGS. 4 and 5, a storage and support apparatus for maintaining a continuous loop chain in an untangled condition is indicated generally by reference numeral 10. Support apparatus 10 is specifically adapted for use with continuous loop roller chains comprised of individual links having at least one plate and an interconnecting pin. The interconnecting pin of each link interconnects a pair of immediately adjacent links and restricting such adjacent links to pivoting relative to one another about a single pivot axis. Examples of such roller chains include bicycle chains and saw chain. Many other roller drive chains are also comprised of links interconnected in this manner.

FIGS. 1-3 are provided as a representative example of such a roller chain, and illustrate the ability of such a chain to become easily tangled. Such figures illustrate a saw chain 12 which is comprised of a repetitive pattern of alternating drive, cutter and interconnect links 14, 16, and 24, respectively. Links 14, 16, and 24 are interconnected to define a continuous roller chain loop having an internal portion 13 and an external portion 15.

Cutter links 16 are comprised of a pair of opposing plates 18, 20. Plate 18 extends outwardly of the chain loop, and is sharp and shaped to provide the desired cutting function when driven by a chain saw. Opposing plate 20 further defines cutter link 16 and provides necessary structural support to the chain. A pair of pins 22 interconnect plates 18 and 20 with one another and to the associated drive links 14 immediately adjacent thereto. Alternate cutter links 16 around the loop have their respective cutting plate 18 and plate 20 oppositely positioned. This places the actual cutter plates 18 on alternating sides of the chain around the loop.

Drive links 14 are defined by a single plate member which is received between adjoining plates 18, 20 at the ends of each cutter link 16. The adjacent drive links 14 extending from opposite ends of adjacent cutter links 16 are interconnected by interconnecting links 24, alternately termed as side-straps. Interconnecting links 24 are defined by a pair of opposing plates 25 which are interconnected to each other and to adjacent drive links 14 by interconnecting pins 27. Plates 25 are identical in size, shape, and material to cutter link plates 20. Similarly, pins 27 are identical to pins 22. As illustrated by FIG. 3, the opposing interconnected pairs of plates of the cutter and interconnecting links 16, 24 respectively, define a maximum link or chain thickness, which is represented by letter 'A'. The above is merely illustrative of a common example prior art saw chain.

FIG. 2 illustrates a phantom section 12a of saw chain 12 being pivoted about one interconnecting pin 27a. This illustrates the limited pivoting capability of this broad type of roller chain to pivoting abou a single pivot axis, which is the specific type of chain to which this invention is directed. FIG. 1 illustrates saw chain 12 in a multiple looped, or tangled condition, which is a common problem with such roller chains. It can be especially difficult to untangle such a saw chain due to its sharp cutter links 16 which can easily cut a user.

Referring again to the invention and particularly to FIGS. 4 and 5, support apparatus 10 includes an elongated base 26 having opposed first and second faces 28, 30 respectively, and opposed longitudinal ends 29, 31. Second face 30, which is not viewable in the figures, would be planed or otherwise provided as a smooth and flat surface. An elongated stationary projection 32, alternately termed first chain block 32, projects outwardly relative to first face 28 to some distance at least equal to and preferably greater than thickness dimension 'A'. As illustrated, the height or thickness of stationary projection 32 is much greater than saw chain thickness 'A'. Stationary projection 32 is elongated and mounted to or otherwise formed adjacent base end 31.

A movable projection 34, alternately termed second chain block 34, projects outwardly relative to first face 28 adjacent base end 29. As shown, movable projection 34 has a thickness or height dimension equal to that of stationary projection 32. Projection 34 is movable relative to face 28, and toward and away from stationary projection 34. Both of projections 32 and 34 include a protective rubber strip 33 adhered to their respective outermost longitudinal ends.

Stationary projection 32 includes a square cross-sectioned hollow internal portion or channel 36 extending therethrough. Movable projection 34 includes a narrow rectangular cross-sectioned interconnecting extension 38 which is complementary in size and shape to hollow channel 36. Extension 38 slidably extends into channel 36, and is accordingly movable into and out of channel 36. Movable projection 34 is not otherwise connected or adhered relative to first face 28 of base 26. In this manner, movable projection 34 is movable toward and away from stationary projection 32. Extension 38 and channel 36 function as a coupling means for movably interconnecting the stationary and movable projections.

A coil spring 40 is internally received within hollow channel 36. Coil spring 40 has opposed ends 42 and 44. Spring end 42 internally bears or biases against stationary projection 32, while spring end 44 bears or biases against the innermost end of movable projection extension 38. In this configuration, spring 40 functions as a biasing means to bias movable projection 34 away from stationary projection 32.

A stop means, in the form of a right angled hook 46, projects from first face 28 of base 26 adjacent end 29. Hook 46 limits the movement of projection 34 away from projection 32 to some maximum extent. Base end 29 is also provided with a hole 48 which extends therethrough to enable a user to more easily handle the support apparatus, and to hang the apparatus on a suitable wall hanger, such as a nail or hook.

Operation of support apparatus 10 is explained with reference to FIGS. 4 and 5. FIG. 4 illustrates apparatus 10 in an inoperative state, i.e. no chain is received by apparatus 10. Coil spring 40 biases against stationary projection 32 and movable projection 34 to force movable projection 34 against stop hook 46. FIG. 5 illustrates apparatus 10 receiving a continuous loop chain 12b. Chain 12b is diagrammatically illustrated as a simple loop for clarity and simplification. To mount chain 12b as illustrated, a user would grasp base 26 and bias movable projection 34 and extension 38 in the direction of stationary projection 32, and against spring 40. Interconnecting extension 38 would be forced a sufficient distance into hollow channel 36 such that the distance between the outermost ends of stationary chain block 32 and movable chain block 34 is less than the maximum internal length of chain loop 12b. While holding movable projection 34 in this compressed condition, chain loop 12b would be placed over and around stationary projection 32 and movable projection 34. The user would then release movable projection 34 to allow spring 40 to force movable projection 34 away from stationary projection 32. This forces projections 32 and 34 against opposite first and second internal portions 50, 52 respectively, of chain loop 12b. This places chain 12b in tension, as illustrated in FIG. 5, and maintains such chain in an expanded and untangled condition for storage or transport. Hole 48 provides a finger hole for the user to transport the chain, or a hanger hole for hanging the base and correspondingly the chain on a suitable hanger on a wall.

As stated previously, the thickness or height of the stationary and movable projections needs to be great enough to be able to contact internal portions of the continuous chain loop to place such a chain in tension. The height or thickness dimension is preferably significantly greater than the thickness of the chain which the apparatus is adapted to retain. This enables multiple similarly sized chains to be stored with the apparatus.

FIG. 6 is a side elevational view diagrammatically illustrating a series of three chain loops 12c, 12d, and 12e retained by support apparatus 10.

The biased nature of projection 32 and 34 relative to one another, and the length of extension 38, enables a wide variety size of roller chains to be stored by the apparatus at different times. A large base could also be constructed having a series of opposing stationary and movable chain block pairs received thereon to enable storing of more and different sized chains.

In the illustrated and preferred embodiment, the apparatus construction includes a base and at least one stationary and one movable chain block which are movably coupled together. This preferred apparatus provides stability and a convenient means for carrying and for hanging the apparatus relative to a wall or other structure. The apparatus might also be constructed without a base, merely having first and second chain blocks which are movably coupled and biased relative to one another, without departing from the principles and scope or the invention.

In compliance with the statute, the invention has been described in language more or less specific as to structural features. It is to be understood, however, that the invention is not limited to the specific features shown and described, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A roller chain storage support apparatus in combination with a continuous loop roller chain of a known length and thickness comprised of individual links of a known pitch having at least one plate and an interconnecting pin, the interconnecting pin interconnecting a pair of immediately adjacent links and restricting such adjacent links to pivoting relative to one another about a single pivot axis in a desired plane, the support apparatus comprising:

a base having a length greater than the known length of the roller chain and having opposed first and second faces;

a stationary roller chain block affixed to the first face and projecting outward therefrom a distance greater than the chain thickness;

said stationary roller chain block having a first curved end surface and first side surfaces spaced apart a prescribed first width distance for receiving a segment of the continuous roller chain thereon to form a first curved loop end about the curved end surface and spaced apart, substantially linear flights along the side surfaces in the prescribed plane;

a movable roller chain block mounted for movement toward and away from the stationary roller chain block between a contracted position and a fully extended position in which the movable roller chain block extends outward from the first face a distance greater than the thickness of the roller chain;

said movable roller chain block having a curved second end surface and second side surfaces that are spaced apart a second prescribed width distance for receiving an opposing segment of the continuous roller chain to form a second chain loop about the second curved end surface and continuations of the chain flights along the second side surfaces in the desired plane;

wherein the first and second curved ends are spaced apart a distance less than the length of the continuous roller chain when the movable roller chain block is in the contracted position and wherein the first and second curved ends are spaced apart a distance greater than the length of the continuous roller chain when the movable roller chain block is in the fully extended position; and biasing means biasing the movable roller chain block away from the stationary roller chain block and from the contracted position toward the fully extended position maintaining the roller chain flights in tension between the two chain loops in the desired plane while the continuous roller chain in being stored on the storage apparatus preventing the continuous roller chain from becoming entangled.

2. The continuous loop chain support apparatus of claim 1 wherein the curved ends and the side surfaces are covered by a resilient protective material to receive and conform to the links.

3. The continuous loop chain support apparatus of claim 1 wherein, the stationary block includes a hollow internal portion;

an interconnecting extension extends from the movable block and into the hollow internal portion of the stationary block;

wherein the width distance between the first side surfaces of the stationary block and the width distance between the second side surfaces are substantially equal to maintain the flights substantially parallel in the desired plane; and the biasing means comprises a coil spring internally received within the hollow internal portion, the coil spring having opposed ends, one opposed end of the coil spring biasing against the stationary block, the other opposed end of the coil spring biasing against the interconnecting extension to bias the movable block from the stationary block.

4. The continuous loop chain support apparatus of claim 3 wherein the base is longitudinally elongated and includes a hole extending therethrough adjacent one longitudinal end to enable a user to more easily handle the support apparatus and to hang the support apparatus on a suitable wall hanger.

5. The continuous loop chain support apparatus of claim 1 further comprising stop means projecting from the first face of the base for limiting the movement of the movable block away from the stationary block to the fully extended position, the movable block being positioned between the stationary block and the stop means.

6. The continuous loop chain support apparatus of claim 1 wherein, the stationary block includes a hollow internal portion;

an interconnecting extension extends from the movable block and into the hollow internal portion of the stationary block;

wherein the distances between the side surfaces of the roller chain blocks are greater than the pitch of the continuous roller chain; and the biasing means comprises a coil spring internally received within the hollow internal portion, the coil spring having opposed ends, one opposed end of the coil spring biasing against the stationary block, the other opposed end of the coil spring biasing against the interconnecting extension to bias the movable block from the stationary block.

7. The continuous loop chain support apparatus of claim 6 wherein the base is longitudinally elongated and includes a hole extending therethrough adjacent one longitudinal end to enable a user to more easily handle the support apparatus and to hang the support apparatus on a suitable wall hanger.

8. The continuous loop chain support apparatus of claim 1 wherein the stationary and movable blocks project relative to the first face a sufficient distance to contact internal portions of a multiple of side-by-side positioned continuous loop chains and support such multiple chains in their desired planes without becoming entangled.

9. The continuous loop chain support apparatus of claim 8 wherein, the stationary block includes a hollow internal portion;

an interconnecting extension extends from the movable block and into the hollow internal portion of the stationary block;

wherein the width distances between the side surfaces of the stationary and movable roller chain blocks are substantially equal to maintain the tensioned flights substantially parallel with each other with the distance between the flights of each chain being greater than the pitch of the chain; and the biasing means comprises a coil spring internally received within the hollow internal portion, the coil spring having opposed ends, one opposed end of the coil spring biasing against the stationary block, the other opposed end of the coil spring biasing against the interconnecting extension to bias the movable block from the stationary block.

10. The continuous loop chain support apparatus of claim 8 wherein the base is longitudinally elongated and includes a hole extending therethrough adjacent one longitudinal end to enable a user to more easily handle the support apparatus and to hang the support apparatus on a suitable wall hanger.

11. A roller chain storage support apparatus in combination with a continuous loop roller chain comprised of individual links having at least one plate and an interconnecting pin which define a link thickness, the interconnecting pin interconnecting a pair of immediately adjacent links and restricing such adjacent links to pivoting relative to one another about a single pivot axis, the support apparatus comprising:

first and second chain blocks, each block having a thickness dimension greater than the link thickness;

each block having a curved end and spaced apart side surfaces receiving an opposing segment of the continuous roller chain forming a looped end about the curved end and supporting chain flights along the side surfaces;

coupling means movably interconnecting the first and second chain blocks; and biasing means biasing the first and second chain blocks from one another placing said a continuous loop chain internally received by the first and second chain blocks in tension placing and maintaining such chain in an expanded and untangled condition.

12. The continuous loop chain support apparatus of claim 11 wherein, the first chain block includes a hollow internal portion;

the coupling means comprises an interconnecting extension which extends from the second chain block and into the hollow internal portion of the first chain block; and the biasing means comprises a coil spring internally received within the hollow internal portion of the first block, the coil spring having opposed ends, one opposed end of the coil spring biasing against the first chain block, the other opposed end of the coil spring biasing against the interconnecting extension to bias the first and second chain blocks from one another.

13. The continuous loop chain support apparatus of claim 11 wherein the first and second chain blocks each have a thickness dimension which is at least twice as great as the link thickness to allow receipt of a multiple of side-by-side positioned continuous loop chains.

14. The continuous loop chain support apparatus of claim 13 wherein, the first chain block includes a hollow internal portion having a rectangular cross section;

the coupling means comprises an interconnecting extension having a rectangular cross section which extends complementary from the second chain block and into the hollow internal portion of the first chain block to prevent the second block from rotating with respect to the first block; and the biasing means comprises a coil spring internally received within the hollow internal portion of the first block, the coil spring having opposed ends, one opposed end of the coil spring biasing against the first chain block, the other opposed end of the coil spring biasing against the interconnecting extension to bias the first and second chain blocks from one another.

* * * * *